April 28, 1925.
M. W. MACDONALD
1,535,930
FILM SPOOL LOCKING DEVICE
Filed June 5, 1922      2 Sheets-Sheet 1
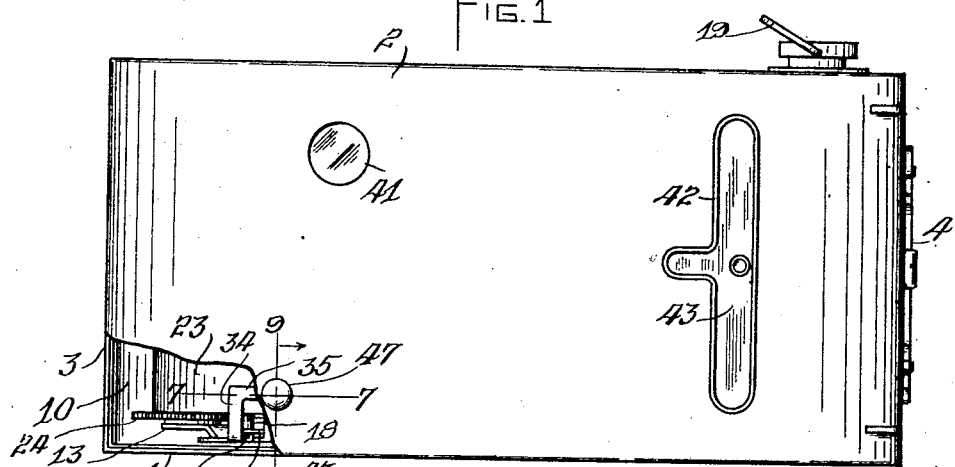
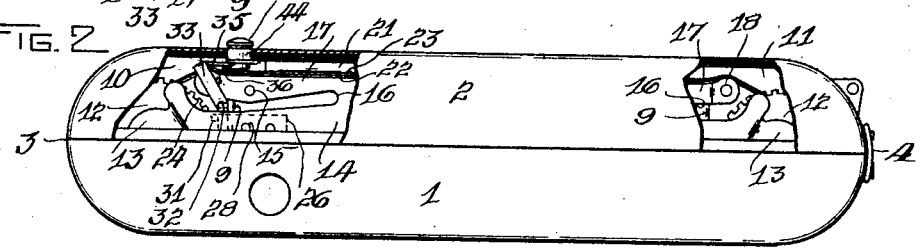
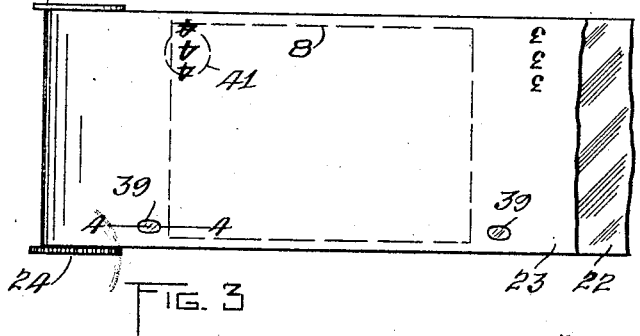
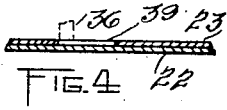
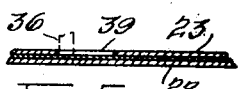
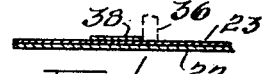
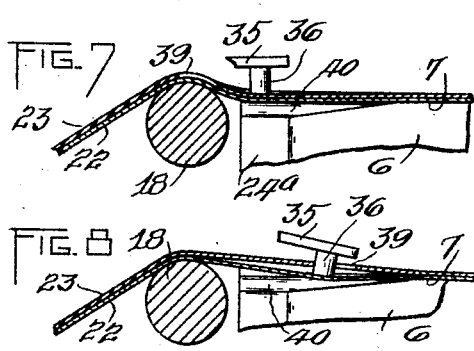
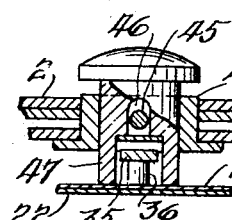
INVENTOR.
Mott W. Macdonald
BY
ATTORNEY

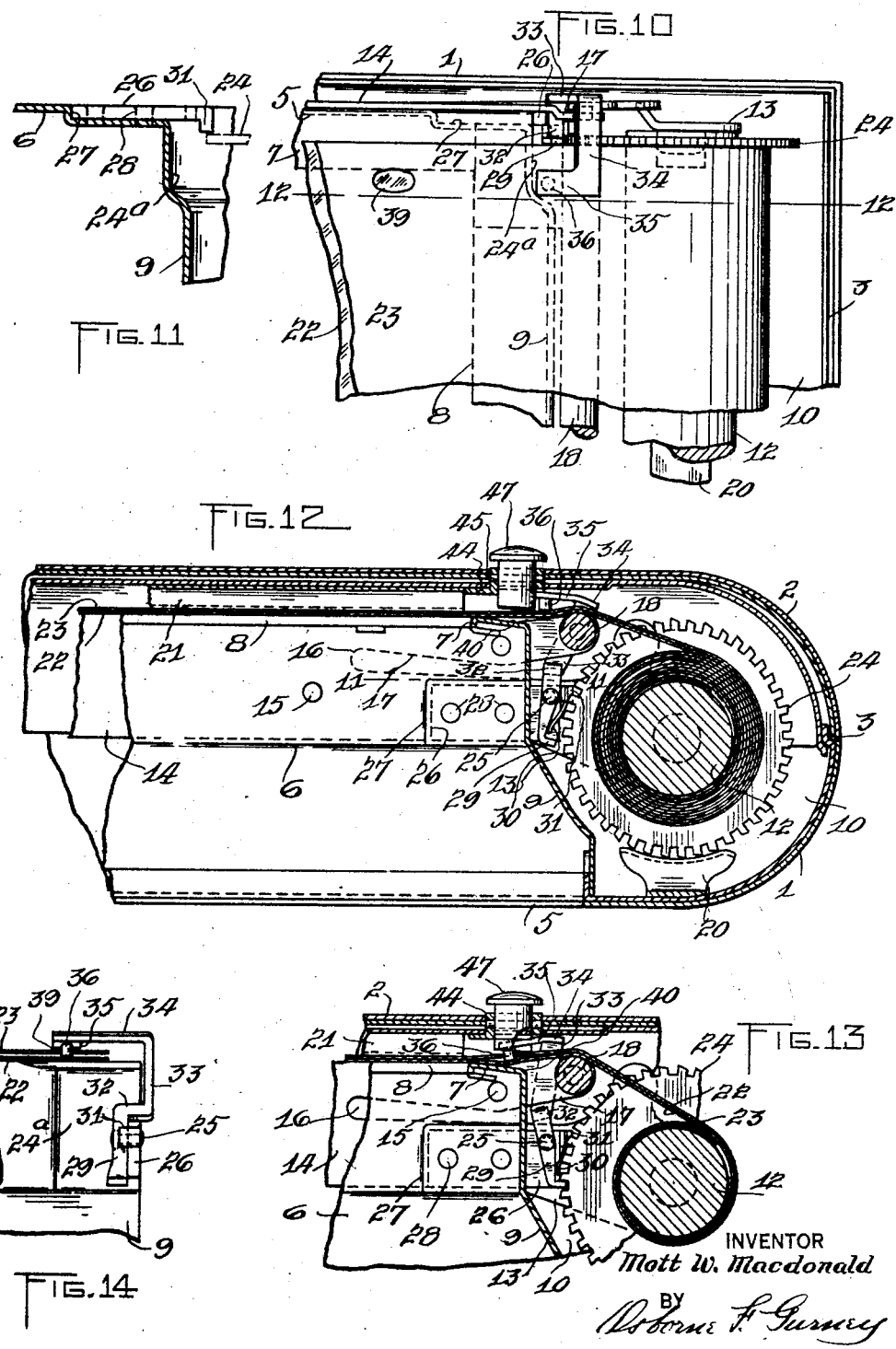

Patented Apr. 28, 1925.

1,535,930

UNITED STATES PATENT OFFICE.

MOTT W. MACDONALD, OF BAY VIEW, IRONDEQUOIT, NEW YORK, ASSIGNOR OF ONE-FOURTH TO ALBERT F. HETTIG, ONE-FOURTH TO OSBORNE F. GURNEY, AND ONE-FOURTH TO CARL GORDON SAMUELSON, ALL OF ROCHESTER, NEW YORK.

FILM-SPOOL-LOCKING DEVICE.

Application filed June 5, 1922. Serial No. 566,066.

*To all whom it may concern:*

Be it known that I, MOTT W. MACDONALD, a citizen of the United States of America, and a resident of Bay View, Irondequoit, in the county of Monroe and State of New York, have invented a new and Improved Film-Spool-Locking Device, of which the following is a specification.

My invention relates to roll film hand cameras and to means for automatically locking the film spool against rotation after a predetermined length of film has been unwound and is in position for exposure, an object of the invention being to facilitate feeding of the film to avoid overlapping of successive pictures and the consequent unnecessary waste of film.

Another object of the invention is to avoid occasion of the user of the camera giving close attention to the feeding of the film and yet secure a feeding forward of precisely the proper length of film, for each exposure, so that the exposure numeral on the film backing strip will register with the window in the camera back which, in autographic cameras, will insure the inscription being properly positioned on the margin of the picture.

Another object of the invention is to provide a manually operable means for the easy and sure release of the film after each feeding operation.

A further object of the invention is to provide a locking device of simple and compact construction, inexpensive to manufacture, positive in operation, and not liable to get out of order.

And, a still further object of the invention is to provide a spool locking device actuated by the backing strip just prior to the completion of each forward movement of the film but with little if any strain being exerted on the backing strip due to its engagement with the locking device.

The commonly used film cartridge is provided with a cover or backing strip interwound with the film and, heretofore, when employed with automatic feed control devices, regularly spaced perforations have been formed in both the film and the backing adapted to receive a locking pin or plunger projecting from a member operable to cause the pin to drop into successive perforations as they move into registration therewith, the film being released after each exposure by a manual operation effecting a disengagement of the locking pin. While the desired result is thus accomplished, that is,—of stopping the forward movement of the film when it has been advanced the required distance after each exposure, the means for effecting the same is objectionable for the reason that it is impractical to perforate the film because of the liability of its being torn by engagement with the locking pin and, furthermore, it is difficult to simultaneously bring corresponding perforations in the film and the backing into registration with such locking member.

Instead of the aforesaid perforations or apertures, I provide regularly spaced marginal apertures in the backing strip, only, adapted to receive a projecting member normally held in the path thereof and against which projecting member the backing strip is yieldingly held due to the resilient action of the film strip, a slight forward movement of the backing strip after locking engagement with the projection has been established effecting actuation of the spool locking mechanism. Although I have spoken of apertures in the backing strip I do not wish to limit the invention to such as slightly raised portions on the strip would accomplish the same result.

These and other objects of the invention will be more clearly set forth in the following description and particularly defined in the appended claims.

The accompanying drawings illustrating the invention are as follows:—

Figures 1 and 2 are rear elevation and side views, respectively, of a hand camera embodying the invention, parts being broken away to show details of construction.

Fig. 3 shows in rear elevation a film cartridge partly unwound and with the exposure opening and window of a camera indicated in broken lines.

Fig. 4 is an enlarged sectional detail on the line 4—4, Fig. 3.

Fig. 5 is a view similar to Fig. 4 of a film such as used in autographic cameras.

Fig. 6 is a view similar to Fig. 4 but showing a raised stop on the backing strip instead of apertures therein.

Figs. 7 and 8 are enlarged sectional details on the line 7—7, Fig. 1, showing the backing strip engaging portion of the locking device respectively in inoperative and operative positions.

Fig. 9 is an enlarged sectional detail on the line 9—9, Fig. 1.

Fig. 10 is an enlarged fragmentary view of the camera with the back removed and showing the locking mechanism in elevation.

Fig. 11 is a sectional detail of the frame on the line 11—11, Fig. 12.

Figs. 12 and 13 are sectional views on the line 12—12, Fig. 10, showing the locking device respectively in inoperative and operative positions.

And, Fig. 14 is a detail view showing the locking device in front elevation.

Similar reference numerals refer to similar parts throughout the several views.

While the present invention may be adapted to any type of roll film camera, it is in this instance illustrated as embodied in one of very compact design and having an all metal body. This body consists of an outer shell or frame formed in two substantially like parts, viz., a front 1 and back 2 secured together at one end by a detachably hinged connection 3 and at the other end by a locking plate 4 slidably mounted on one of the members. The front frame member 1 is formed with an opening 5 for receiving the bellows, shutter and hinged front plate which, forming no part of the invention, have not been shown. The opening 5 is surrounded with an inner frame member 6, the rear wall 7 of which forms a support for the film and is provided with the usual exposure opening 8. The end walls 9 of the inner frame with the ends of the frame members 1 and 2 form pockets 10 and 11 for receiving the film spools 12, such spools being rotatably and removably mounted in the ends of spring arms 13 formed on plates 14 secured by rivets 15 to the outer faces of the side walls of the inner frame member 6. The ends of these plates 14 are slotted at 16 and also form shorter arms 17 in which film supporting rollers 18 are mounted, such rollers lying parallel with and close to the inner walls 9 of the pockets 10 and 11 but slightly in rear of or above, with respect to the drawings, the plane of the film supporting wall 7.

The film cartridge or supply spool is mounted in the pocket 10 and the reel or winding spool in the pocket 11, the usual winding key 19 having connection with the reel while a two arm leaf spring 20 secured to the front frame member 1 in the pocket 10 acts as a drag on the supply spool so that the film is held taut as it passes over the exposure opening 8, longitudinally extending springs 21 carried by the cover 2 also bearing on the film to hold it in flat condition between the two spools.

With this invention a spring actuated pawl makes locking engagement with one of the spools, preferably the supply spool, and to that end it is necessary that the spool be provided with an annular series of suitably co-operating pawl engaging members. Each film cartridge, therefore, comprises the usual film 22 and backing strip 23 interwound on a spool 12, one of the heads 24 of the spool being notched to form a toothed wheel or disk.

The locking device is of very simple construction being formed of a lever pivoted at 25 intermediate its ends to the inner face of a plate 26 having a portion set in a recess 27 in a side wall of the inner frame member 6 and secured to such side wall in any suitable manner as by rivets 28. One arm 29 of this lever is a pawl adapted to engage the teeth in the notched wheel 24, such pawl operating in a recess or depression $24^a$ formed in the adjacent frame wall 9 and being normally held out of locking engagement by means of a leaf spring 30 anchored at one end in a lug 31 bent from the plate 26 and acting also as a stop for the pivoted lever. The spring lies between the outer face of the spool head 24 and the plate 26, and the teeth of the notched wheel are bevelled in the manner indicated so as not to retard the swinging movement of the lever should the pawl engage on the outer face of a tooth. The other arm of the lever is bent to form a portion 32 extending through the slot 16 in the plate 14, a portion 33 engaging outside of the roller supporting arm 17, a portion 34 extending inwardly over the roller 18, and has its end 35 bent at substantially right angles to the portion 34, such end being provided with a projection or detent 36 adapted to co-operate with engaging means formed on or in the adjacent edge of the backing strip 23.

This co-operating means may be in the form of a plurality of raised portions 38 equally spaced along an edge of the backing 23, as in Fig. 6, or, and preferably, a plurality of equally spaced apertures 39 may be provided in the backing strip in line with the detent 36, as in Figs. 4, 5, 7, 8, 10, 13 and 14. The film and backing strip engage over the rollers 18 and under the portions 34 and 35 of the locking lever with the detent 36 riding on the backing strip with a relative resiliency, there being a tendency of the film and backing strip, which are held taut, to lie in the plane of the rollers 18, and to allow space for resilient action of the film and backing strip against the detent and to permit disengagement of the backing strip from the detent a slight depression 40 is formed in the supporting wall 7. When an aperture reaches the detent in the feeding movement of the film, the backing strip separates slightly from the film, as in Fig. 8, thus effecting engagement with the detent. This locking engagement of the detent with the wall of an aperture 39, through a slight continued feeding movement of the film, causes the lever to swing into locking engagement with the toothed head 24 of the spool which positively locks the spool against rotation until it is again released in a manner to be described. As the spring 30 is very light, but little strain is exerted on the backing strip in causing actuation of the locking lever.

When a film has been advanced the proper distance for an exposure, it automatically stops due to the locking of the film cartridge against rotation in the manner and by the means just above described, this stopping taking place when the corresponding number on the film backing is in registration with the window 41. The camera may use autographic film, as shown in Fig. 5, an elongated opening 42 normally closed by a shutter 43 being formed in the camera back to permit use of the stylus, and the positive locking of the film at regular intervals will insure the inscriptions being properly positioned on the margins of the several pictures.

Any suitable manually operable means may be employed for releasing the film for further feeding movement after each exposure. In this instance, the releasing means is a button or plunger 47 mounted in a stud 44 secured in the camera back 2 with its axis approximately in line with that of the detent when the latter is in its forward position, such plunger having its inner end bifurcated to engage over the end portion 35 of the operating lever while a pin 45 carried by the stud and working in a slot 46 in the plunger limits the movement in and out of the plunger. Pressing this plunger 47 disengages the backing strip from the detent 36, permitting the spring 30 to return the locking lever to inoperative position, such movement of the lever carrying the detent to the rear of the aperture 39 from which it has been disengaged so that the film may be again fed forward without the necessity of continuing pressure on the button or plunger 47 until such feeding movement has been started.

It is believed that from the foregoing description the construction and operation of the locking device is sufficiently clear to call for no further explanation, although it may be added that the locking device is preferably located in the camera diagonally opposite the winding key 19 which makes it convenient for the user while holding the camera in both hands to press the film releasing button 47 with the left thumb and turn the winding key by the right thumb and forefinger. No spring is required for returning the button 47 to inoperative position as the yielding of the film and backing strip acts to perform this function.

What I claim is:—

1. In a camera, a supporting frame, a roll film and backing strip movable across the frame, said backing strip having a plurality of regularly spaced apertures, means for locking the film and backing strip against movement, and a detent normally riding on the backing strip with a relatively spring tension, such detent adapted to be received in said apertures and by engagement with the wall of an aperture to effect actuation of the locking means through a slight continued movement of the backing strip.

2. In a camera, a supporting frame, a roll film and backing strip movable across the frame, said backing strip having a plurality of regularly spaced apertures, means for locking the film and backing strip against movement, a detent normally riding on the backing strip with a relatively spring tension, such detent adapted to be received in said apertures and by engagement with the wall of an aperture to effect actuation of the locking means through a slight continued movement of the backing strip, manually operable means for releasing the detent, and means for automatically returning the locking means to inoperative position.

3. In a camera, a supporting frame, a roll film and backing strip simultaneously movable across the frame, the backing strip being provided with a plurality of regularly spaced apertures, and means for arresting the movement of the film and backing strip comprising a stop normally riding over the backing strip and adapted to be received in the said apertures, the backing strip being the movable member in effecting locking engagement with the stop.

4. In a camera, a supporting frame, a roll film and backing strip simultaneously movable across the frame, the backing strip being provided with a plurality of regularly spaced apertures, means for arresting the movement of the film and backing strip comprising a stop normally riding over the backing strip and adapted to be received in the said apertures, the backing strip being the movable member in effecting locking engagement with the stop, and manually operable means for disengaging the backing strip from the stop.

5. In a roll film camera, two spools, a film and backing strip adapted to be wound from one spool onto the other, a notched wheel on one of the spools, a lever pivoted intermediate its ends and having one end adapted to engage said notched wheel, and a detent on the other arm of said lever, the backing strip being formed at regularly spaced intervals so as to engage said detent and by continued feeding movement to effect operative movement of said locking lever.

6. In a roll film camera, two spools, a film and backing strip adapted to be wound from one spool onto the other, a notched wheel on one of the spools, a lever pivoted intermediate its ends and having one end adapted to engage said notched wheel, a detent on the other arm of said lever, the backing strip being formed at regularly spaced intervals so as to engage said detent and by continued movement to effect operative movement of said locking lever, a manually operable plunger for disengaging the backing strip from said detent, and spring means for returning the locking lever to inoperative position.

7. In a roll film camera, two spools, a film and backing strip adapted to be wound from one spool onto the other, said backing strip having regularly spaced marginal apertures, a support for the film between the two spools, a notched wheel on one of the spools, a spring actuated lever pivoted intermediate its ends, normally held in inoperative position by such spring and having one end of the lever adapted to engage said notched wheel, the other arm of the lever having a portion lying parallel with the backing strip, the film and backing strip engaging between such lever portion and said support, a detent on such last named lever portion adapted to be engaged by the walls of said apertures to move the locking lever into operative position, and a manually operable plunger for disengaging the backing strip from said detent.

8. In a roll film camera, a spool for the film and backing strip, said backing strip having a plurality of marginal apertures, a notched wheel on the spool, a spring actuated lever normally held out of engagement with said notched wheel, a detent on said lever adapted to be successively engaged by the walls of said apertures to move the lever into operative position, and a manually operable plunger for disengaging the backing strip from said detent, movement of the lever to inoperative position causing the detent to move to rear of the aperture from which it has been disengaged to permit further feeding of the film.

9. In a roll film camera, two spools, a film and backing strip adapted to be wound from one spool onto the other, said backing strip having a plurality of regularly spaced marginal apertures, a support for the film between the two spools and film supporting rollers adjacent the ends of said support, a notched wheel on one of the spools, plates projecting beyond the ends of said support, such plates being slotted to form spring arms in which said spools are mounted and arms in which said rollers are mounted, a spring actuated lever pivoted intermediate its ends, normally held in inoperative position by such spring and having one end adapted to engage said notched wheel, the other arm of the lever having a portion engaging over the backing strip and another portion operating in the adjacent bearing plate slot, a detent on such first named lever portion adapted to be engaged by the walls of said apertures to move the locking lever into operative position, and a manually operable plunger for disengaging the backing strip from said detent.

MOTT W. MACDONALD.